US012658635B2

(12) United States Patent
Hochgeschurz et al.

(10) Patent No.: US 12,658,635 B2
(45) Date of Patent: Jun. 16, 2026

(54) HOUSING FOR ACCOMMODATING ONE OR MORE CONDUCTOR TERMINALS AND SET FORMED THEREWITH

(71) Applicant: WAGO Verwaltungsgesellschaft mbH, Minden (DE)

(72) Inventors: Stephan Hochgeschurz, Minden (DE); Frank Hartmann, Minden (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 424 days.

(21) Appl. No.: 18/083,657

(22) Filed: Dec. 19, 2022

(65) Prior Publication Data

US 2023/0198200 A1 Jun. 22, 2023

(30) Foreign Application Priority Data

Dec. 22, 2021 (DE) ..................... 20 2021 106 999.6

(51) Int. Cl.

| | |
|---|---|
| ***H01R 13/62*** | (2006.01) |
| ***H01R 11/09*** | (2006.01) |
| ***H01R 13/52*** | (2006.01) |
| ***H01R 13/622*** | (2006.01) |
| *H01R 4/48* | (2006.01) |

(52) U.S. Cl.

CPC .......... *H01R 13/622* (2013.01); *H01R 11/09* (2013.01); *H01R 13/5202* (2013.01); *H01R 4/4821* (2023.08)

(58) Field of Classification Search

CPC .... H01R 13/5213; H01R 11/09; H01R 13/68; H01H 85/201

See application file for complete search history.

(56) References Cited

U.S. PATENT DOCUMENTS

| | | | | |
|---|---|---|---|---|
| 3,914,015 A | | 10/1975 | Mc Cartney | |
| 4,060,299 A | * | 11/1977 | Williams | H01R 13/746 439/551 |
| 5,648,749 A | * | 7/1997 | Lin | H01R 4/36 439/620.28 |
| 5,772,473 A | * | 6/1998 | Cheng | H01H 85/201 439/805 |
| 7,281,942 B2 | * | 10/2007 | Swedberg | H01R 4/4833 439/441 |
| 7,448,901 B2 | * | 11/2008 | Weber | H01R 9/2491 439/427 |
| 7,517,157 B1 | * | 4/2009 | McNiece | G02B 6/403 385/60 |

FOREIGN PATENT DOCUMENTS

| | | |
|---|---|---|
| CN | 111725636 A | 9/2020 |
| CN | 212412232 U | 1/2021 |
| DE | 2545258 A1 | 4/1976 |
| DE | 19741572 A1 | 3/1999 |
| DE | 202005001729 U1 | 5/2005 |
| DE | 102011086330 A1 | 5/2013 |
| EP | 2595248 A1 | 5/2013 |
| GB | 2060278 A | 4/1981 |
| WO | WO2018116239 A1 | 6/2018 |

* cited by examiner

*Primary Examiner* — Ross N Gushi

(74) *Attorney, Agent, or Firm* — Muncy, Geissler, Olds & Lowe, P.C.

(57) ABSTRACT

A housing for accommodating one or more conductor terminals which are designed as through connectors. The invention also relates to a set of such a housing and one or more conductor terminals which are designed as through connectors.

12 Claims, 3 Drawing Sheets

HOUSING FOR ACCOMMODATING ONE OR MORE CONDUCTOR TERMINALS AND SET FORMED THEREWITH

This nonprovisional application claims priority under 35 U.S.C. § 119(a) to German Patent Application No. 20 2021 106 999.6, which was filed in Germany on Dec. 22, 2021, and which is herein incorporated by reference.

BACKGROUND OF THE INVENTION

Field of the Invention

The invention relates to a housing for accommodating one or more conductor terminals which are designed as through connectors. The invention also relates to a set of such a housing and one or more conductor terminals which are designed as through connectors.

Description of the Background Art

Conductor terminals are available in the electrical sector in a variety of designs, e.g., as screw terminals, e.g., in the form of luster terminals, or as spring-loaded terminals, which have respective spring-loaded terminals for connecting electrical conductors. Conductor terminals which are designed as through connectors are characterized in that they have at least two conductor terminals for joining and electrically connecting at least two electrical conductors. The conductor insertion openings for these conductor connections are arranged on diametrically opposite sides of the housing of the conductor terminal.

Depending on the technical design, the conductor terminals are available with differently designed housings, in particular with different external cross-sectional shapes. Usually, the conductor terminals are not or only slightly protected against the penetration of dirt and moisture. In some applications, increased protection is required, especially against moisture. For example, there is a need for moisture protection in accordance with protection class IP68.

A housing for an electrical plug connection is known, for example, from U.S. Pat. No. 3,680,036.

SUMMARY OF THE INVENTION

It is therefore an object of the present invention to provide a housing for accommodating one or more conductor terminals which are designed as through connectors. Furthermore, a set formed herewith shall be specified.

In an exemplary embodiment, this object is achieved by a housing for accommodating one or more conductor terminals designed as through connectors, having the following features:

a) the housing has a tubular central receiving body, which is formed closed on the circumferential side and has at least one continuous opening extending from a first end face of the receiving body to the opposite second end face of the receiving body;
b) the continuous opening has an internal cross-sectional contour in at least one middle region in the axial direction middle region which is adapted with a predefined external cross-section shape to the outer contour of a predefined number of conductor terminals that are to be accommodated in the continuous opening,
c) the receiving body has a first thread on the first end face and a second thread on the second end face;

d) the housing has a first screw cap with a thread via which the first screw cap can be screwed onto the first thread on the first end face of the receiving body,
e) the housing has a second screw cap with a thread via which the second screw cap can be screwed onto the second thread on the second end face of the receiving body.

The invention has the advantage that a housing, which is easy to use and to assemble for the user, for accommodating one or more conductor terminals in the form of through connectors is specified. The housing can be formed with relatively few individual parts, which promotes a simple construction and simple assembly. In addition, the housing is suitable for the realization of a simple and reliable sealing concept, in which there are no user errors.

Advantageously, the housing has a tubular central receiving body, which is formed closed on the circumferential side. This ensures a good shielding effect of the conductor terminals arranged in the housing or in the opening of the central receiving body against environmental influences. Due to the continuous opening, the conductor terminals are ensured to be easily received and/or attached in the receiving body. The receiving body may be wholly or partially cylindrical on the outside, but it may also have other cross-sectional shapes on the outside.

Advantageously, the receiving body can have an inner cross-sectional contour in its internal opening, which is adapted to the outer contour of conductor terminals to be accommodated therein. This also promotes easy assembly for the user. In addition, the conductor terminals arranged in the continuous opening can be reliably held and are also protected against vibration loads.

The simple assembly of the parts of the housing is additionally promoted by the fact that the first and second screw caps can be connected to the central receiving body via a threaded connection. This allows for a simple and intuitive assembly of the housing. In an advantageous embodiment of the invention, the first screw cap and/or the second screw cap each have a through opening for feed-through of an electrical cable whose electrical conductors (insulated conductors) are connected to the conductor terminals arranged in the housing.

In this way, a novel, particularly advantageous encapsulation for through connectors is created.

The first thread and/or the second thread can be formed as an external thread. This also promotes a simple and intuitive assembly of the parts of the housing. In addition, the threaded connections can be dimensioned relatively large and accordingly have a high strength. For example, the first screw cap and/or the second screw cap may be formed in the manner of a union nut. Advantageously, a strain relief for the electrical cable led through the passage opening of the screw cap may also be formed or arranged in a screw cap, for example by means of a clamping element having clamping lugs.

The receiving body may be one-piece or multi-part, for example in the form of a single injection-molded component or in the form of several injection-molded components.

The receiving body with the inner cross-sectional contour can be formed one-piece. This has the advantage that the assembly of the parts of the housing is particularly simple for the user, wherein the insertion of the conductor terminals is thereby also made particularly simple and ergonomic by the predetermined inner cross-sectional contour.

The continuous opening can have a constant internal cross-sectional contour in the axial direction. In this way, the conductor terminals to be inserted into the opening can be guided through the inner cross-sectional contour right at the beginning of the insertion process.

The inner cross-sectional contour of the continuous opening can have a star shape. This optimizes the use of space in the interior of the receiving body. Due to the star shape, longitudinal bars are also formed on the inside of the opening, which further increase the strength or rigidity of the receiving body.

The housing can have a first seal, which is pressable against the receiving body by means of the first screw cap by tightening the threaded connection of the first screw cap on the first end face, and/or the housing has a second seal, which is pressable against the receiving body by means of the second screw cap by tightening the threaded connection of the second screw cap on the second end face. This allows for reliable sealing of the housing, so that the penetration of moisture into the interior of the housing is reliably avoided. By pressing the first seal or the second seal, it can also be slightly widened in the radial direction, so that a reliable seal to the cable guided through it can also be realized. The first seal and/or the second seal may be formed as a ring-shaped seal. The first seal and/or the second seal may be formed rotationally symmetrically with an internal opening aligned with the continuous opening of the receiving body.

The first seal and/or the second seal can have a profile in an axial cutting plane, which has a radial branch and an axial branch protruding therefrom, wherein the radial branch extends predominantly in the radial direction of the receiving body and the axial branch extends predominantly in the axial direction of the receiving body. In this way, the first seal or the second seal can create a good seal for both the separation plane between the respective protective cap and the receiving body and the cable that is passed through. In this case, the radial branch of the respective seal can be pressed to the receiving body by means of the respective screw cap. The axial branch can lie sealingly on the outer surface of a cable passed through the seal. In other words, the seal has an L-shaped cross-sectional shape.

The first seal and/or the second seal may advantageously be made of an elastic material, for example of an elastomer such as rubber or silicone.

The housing can include the central receiving body, the first screw cap, the second screw cap, the first seal and the second seal. With such a five-part structure, the housing can be provided cost-effectively and is easily assembled by the user. In addition, a high mechanical robustness can be achieved.

The receiving body may have only one continuous opening. This allows for a particularly simple and ergonomic insertion of the conductor terminals into the continuous opening.

The first screw cap and/or the second screw cap, in at least one region of its outer surface, can have a corrugation, a square contour and/or a hexagonal contour. This has the advantage that the first screw cap or the second screw cap can be easily rotated by the user about the longitudinal axis and accordingly the threaded connection can be reliably tightened either manually without tools or with the help of a tool, e.g., a wrench. For this purpose, the receiving body may advantageously have a contour for attaching a tool on its outer circumferential surface, for example in the form of at least two opposing flattenings, so that a counter-hold can be ensured when tightening the screw caps.

The above-mentioned object is also achieved by a set made up of a housing of the type described above and one or more conductor terminals which are formed as through connectors, wherein the one conductor terminal or the plurality of conductor terminals can be accommodated form-fittingly in the continuous opening of the receiving body. This also allows for the advantages described above to be realized. Due to the form-fitting accommodation of the conductor terminal or the plurality of conductor terminals, these are held at a defined position, wherein they can be held in the radial direction in particular with little play, so that they cannot bump excessively against the inner walls of the receiving body even under vibration loads.

One or more conductor terminals may each have spring-loaded terminals for connecting electrical conductors. In this way, the electrical conductors can be connected to the conductor terminals by the user particularly easily and in many cases without tools. The spring-loaded terminals also ensure long-lasting, reliable contacting. Such a spring-loaded terminal connection may, for example, have a clamping spring, wherein, depending on the design, a busbar may also be present. For actuating the clamping spring, the conductor terminal may have an actuating element, e.g., a swiveling actuating lever.

For the purposes of the present invention, the undefined term "a" is not to be understood as a numeral. If, for example, a component is mentioned, this is to be interpreted in the sense of "at least one component". If angles are given in degrees, they refer to a circular dimension of 360 degrees (360°).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
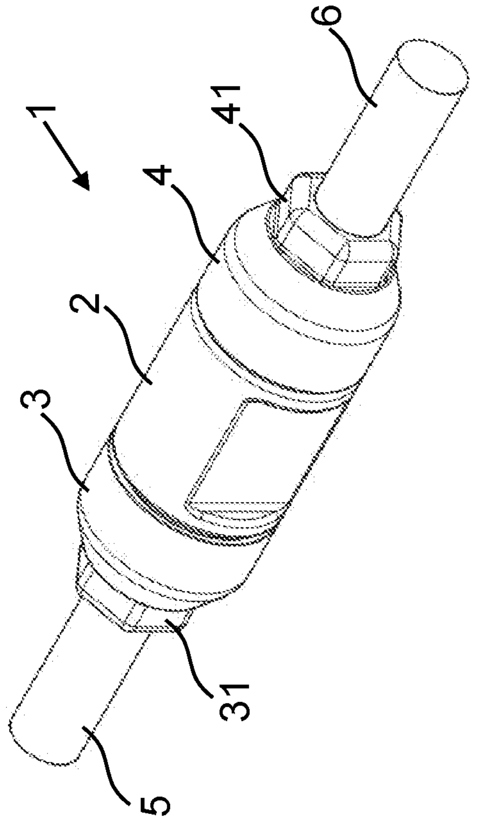
FIG. 1 shows a housing in a perspective view.
Figure 2:
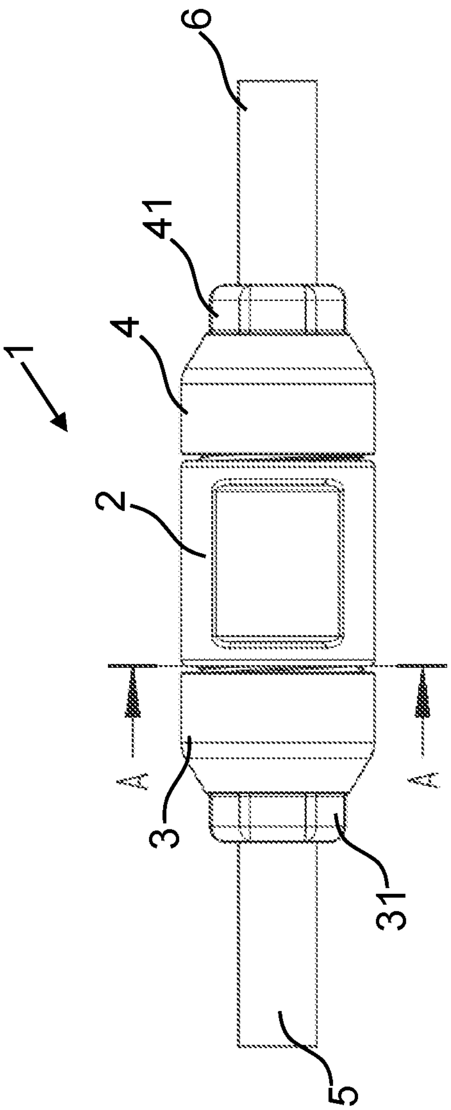
FIG. 2 shows the housing according to FIG. 1 in a side view.

FIGS. 1 and 2 illustrate that the housing 1 has a tubular central receiving body 2, on the first end face of which a first screw cap 3 is arranged and on the second end face of which a second screw cap 4 is arranged. The first screw cap 3 has an external hexagonal contour 31 in an area facing away from the receiving body 2. The first screw cap 3 has an axially continuous opening, through which a first cable 5, for example a NYM cable, is passed. The second screw cap 4 has an external hexagonal contour 41 in an area facing away from the receiving body 2. The second screw cap 4 has an axially continuous opening, through which a second cable 6, for example a NYM cable, is passed.

Figure 3:
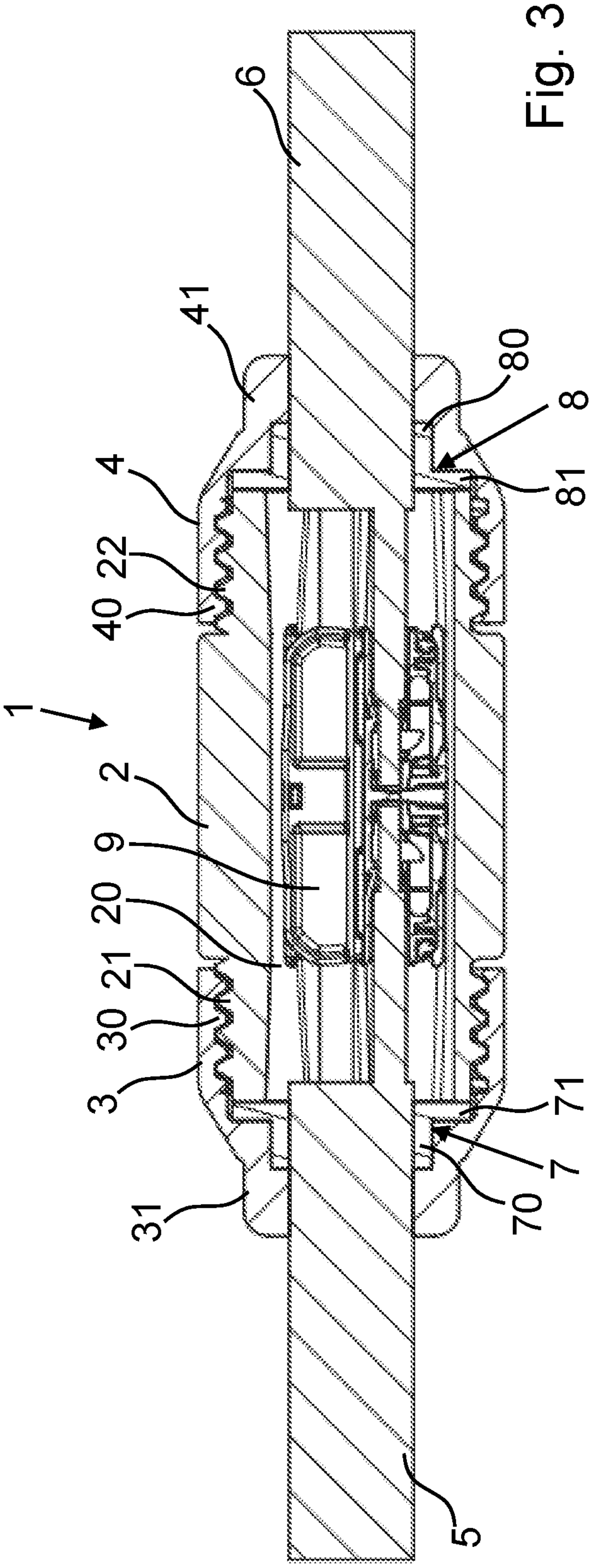
FIG. 3 shows the housing according to FIG. 2 in a longitudinal cut.

As can be seen in FIG. 3, the receiving body 2 has a first thread 21 in the form of an external thread on the first end face. The first screw cap 3 has an internal thread 30 assigned to the first thread 21, which is screwed onto the first thread 21. The receiving body 2 has a second thread 22 in the form of an external thread on the second end face. The second screw cap 4 has an internal thread 40 assigned to the second thread 22, which is screwed onto the second thread 22.

Inside the receiving body 2 is a continuous opening 20. In this opening 20, a plurality of conductor terminals 9 are arranged, to each of which individual conductors of cables 5, 6 are connected.

Between the receiving body 2 and the first screw cap 3 is a first seal 7. The first seal 7 has a radial branch 71, which is pressed against the end face of the receiving body 2 by the tightened threaded connection of the first screw cap 3. The first seal 7 further has an axial branch 70, which is sealed over a certain longitudinal section to the first cable 5 arranged therein. The same applies to the second seal 8.

Between the receiving body 2 and the second screw cap 4 is a second seal 8. The second seal 8 has a radial branch 81, which is pressed by the tightened threaded connection of the second screw cap 4 against the end face of the receiving body 2. The second seal 8 further has an axial branch 80, which rests sealingly over a certain longitudinal section on the second cable 6 arranged therein.

Figure 4:
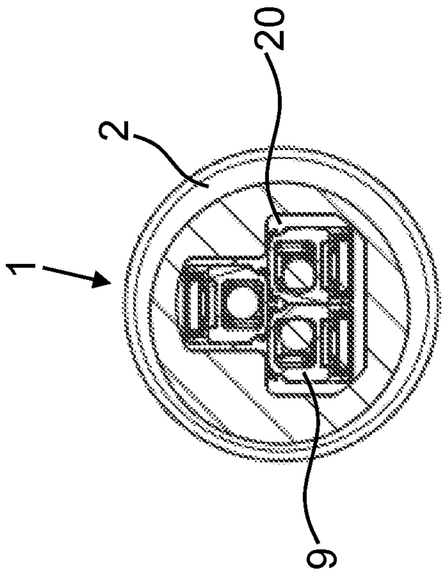
FIG. 4 shows the housing according to FIG. 2 in the sectional plane A-A.

FIG. 4 shows the described elements in cross-section.

Figure 5:
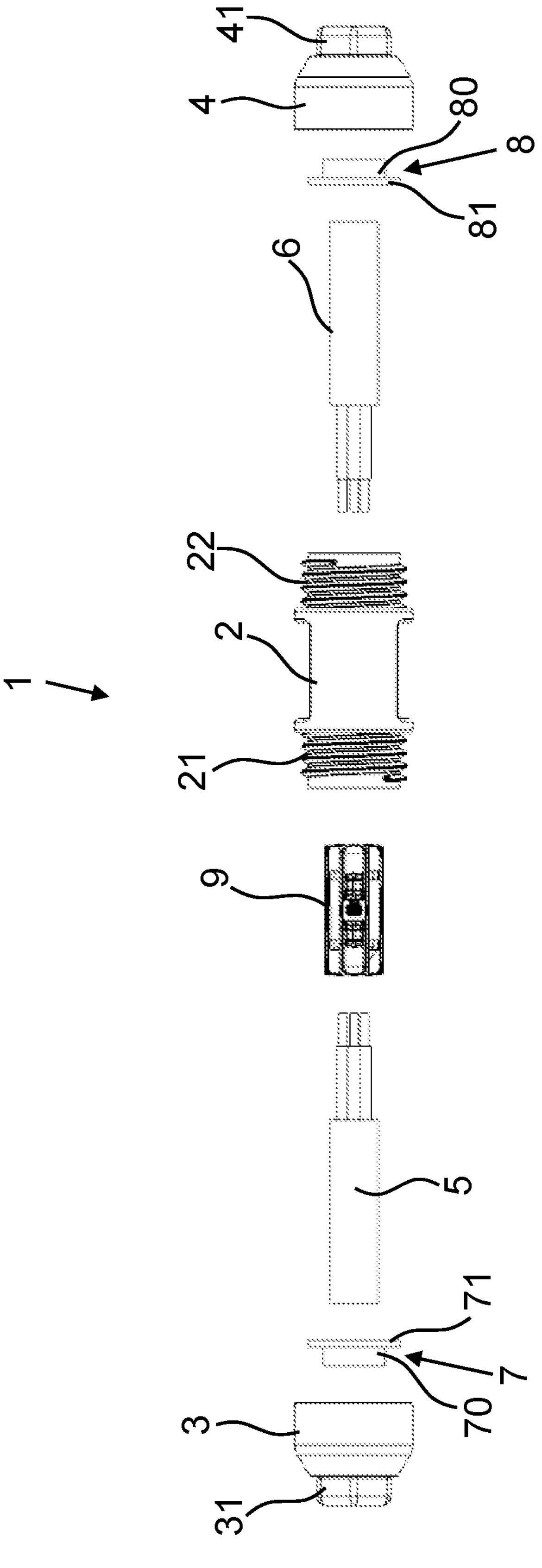
FIG. 5 shows the housing with conductor terminals in a side view in an exploded view.

In FIG. 5 one can see the described elements of the housing 1 and the conductor terminals 9 and the cables 5, 6 prior to assembly. The assembly of the displayed elements can be carried out, for example, with the following assembly steps:

Plug the first screw cap 3 and the first seal 7 onto the cable end of the first cable 5, likewise plug the second screw cap 4 and second seal 8 onto the cable end of the second cable 6.

Plug the first cable 5 or the second cable 6 with the cable end through the receiving body 2 so far that the cable end protrudes sufficiently far on the opposite end face to connect the conductor terminals 9 to the electrical conductors of the cable.

Connect the conductor terminals 9 to the cable inserted in step 2 or to its electrical conductors.

Connect the opposite side of the conductor terminals 9 to the electrical conductors of the not yet connected cable.

With the cable first plugged through the receiving body 2, pull the conductor terminals 9 into the continuous opening 20 of the receiving body 2 so far that they are arranged approximately centrally therein.

Screw the first screw cap 3 and the second screw cap 4 to the receiving body 2.

In this process, steps 3 and 4 can also be swapped.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing to accommodate one or more conductor terminals that are designed as through connectors, the housing comprising:

a tubular central receiving body, which is formed circumferentially closed and has at least one continuous opening, which extends axially from a first end face of the receiving body to the opposite second end face of the receiving body, wherein an inner cross-sectional contour of the at least one continuous opening is non-circular and corresponds to a predefined shape of an outer contour of a predefined number of conductor terminals to be received in the at least one continuous opening, and wherein the inner cross-sectional contour is provided along an axial extent of the at least one continuous opening, such that the inner cross-sectional contour is constant along the axial extent of the at least one continuous opening which extends from the first end face of the receiving body to the opposite second end face of the receiving body;

a first thread formed on the receiving body adjacent to the first end face and a second thread formed on the receiving body adjacent to the second end face;

a first screw cap, the first screw cap having a thread via which the first screw cap is screwed onto the first thread of the receiving body;

a second screw cap, the second screw cap having a thread via which the second screw cap is screwed onto the second thread of the receiving body, wherein the housing has a first seal, which is pressed against the receiving body via the first screw cap by tightening the threaded connection of the first screw cap on the first end face, wherein the first seal has a profile in an axial cutting plane which has a radial branch and an axial branch protruding therefrom, wherein the radial branch extends predominantly in the radial direction of the receiving body and the axial branch extends predominantly in the axial direction of the receiving body, and wherein a first end face of the radial branch of the first seal, that faces the first end face of the receiving body, directly abuts the first end face of the receiving body.

2. The housing according to claim 1, wherein the first thread and/or the second thread is formed as an external thread on the receiving body.

3. The housing according to claim 1, wherein the receiving body, with the inner cross-sectional contour, is formed as one-piece.

4. The housing according to claim 1, wherein the inner cross-sectional contour of the at least one continuous opening extends, in the axial direction; from the first end face of the receiving body to the second end face of the receiving body.

5. The housing according to claim 1, wherein the housing consists of the central receiving body, the first screw cap, the second screw cap, the first seal which is pressed against the receiving body via the first screw cap by tightening the threaded connection of the first screw cap on the first end face and the second seal which is pressed against the receiving body via the second screw cap by tightening the threaded connection of the second screw cap on the second end face.

6. The housing according to claim 1, wherein the receiving body has only one of the at least one continuous opening.

7. The housing according to claim 1, wherein at least one region of an outer surface of the first screw cap and/or the second screw cap has a corrugation, a square contour and/or a hexagonal contour.

8. A set, comprising:

a housing according to claim 1; and the at least two conductor terminals, wherein the at least two conductor terminals are accommodated in the at least one continuous opening of the receiving body.

9. The set according to claim 8, wherein the at least two conductor terminals are each provided to connect electrical conductors.

10. The housing according to claim 1, wherein a second end face of the radial branch of the first seal, that opposes the first end face of the radial branch of the first seal, directly abuts a first inner shoulder of the first screw cap, and wherein an end face of the axial branch of the first seal, that faces away from the first end face of the receiving body, directly abuts a second inner shoulder of the first screw cap.

11. The housing according to claim 1, wherein the housing has a second seal which is pressed against the receiving body via the second screw cap by tightening the threaded connection of the second screw cap on the second end face, wherein the second seal has a profile in an axial cutting plane which has a radial branch and an axial branch protruding therefrom, wherein the radial branch extends predominantly in the radial direction of the receiving body and the axial branch extends predominantly in the axial direction of the receiving body, and wherein a first end face of the radial branch of the second seal, that faces the second end face of the receiving body, directly abuts the second end face of the receiving body.

12. The housing according to claim 11, wherein a second end face of the radial branch of the second seal, that opposes the first end face of the radial branch of the second seal, directly abuts a first inner shoulder of the second screw cap, and wherein an end face of the axial branch of the second seal, that faces away from the second end face of the receiving body, directly abuts a second inner shoulder of the second screw cap.

* * * * *